(12) United States Patent
Yutani (10) Patent No.: US 6,351,597 B2
(45) Date of Patent: Feb. 26, 2002

(54) DATA RECORDING AND REPRODUCING METHOD AND DATA RECORDING AND REPRODUCING APPARATUS

(75) Inventor: Satoshi Yutani, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/287,874

(22) Filed: Apr. 7, 1999

Related U.S. Application Data (63) Continuation of application No. PCT/JP98/03532, filed on Aug. 7, 1998.

(30) Foreign Application Priority Data

Aug. 7, 1997 (JP) .......................................... 09-213357

(51) Int. Cl.[7] ........................... H04N 5/76; H04N 5/921
(52) U.S. Cl. ............................. 386/65; 386/64; 386/46
(58) Field of Search ........................... 386/65, 46, 52, 386/64, 107, 117, 123, 124, 1, 4, 37, 38, 40, 66, 109, 111, 112, 95, 98, 125; 360/32; H04N 5/76, 5/921

(56) References Cited

U.S. PATENT DOCUMENTS 5,583,567 A * 12/1996 Nagasawa et al. .......... 348/207
5,754,730 A * 5/1998 Windrem et al. ........... 386/124
6,101,314 A * 8/2000 Keesen ........................ 386/124
6,115,536 A * 9/2000 Iwasaki et al. .............. 386/106

FOREIGN PATENT DOCUMENTS

| JP | 7-319631 | 12/1995 | ............. G06F/3/06 |
| JP | 8-297916 | 11/1996 | ........... G11B/20/10 |
| JP | 9-69261 | 3/1997 | ........... G11B/20/10 |

* cited by examiner

Primary Examiner—Robert Chevalier
(74) Attorney, Agent, or Firm—Bell, Boyd & Lloyd LLC (57) ABSTRACT

Upon recording, movable terminals b of switches 112 and 119 are switched to the terminals a1 sides, whereas upon reproduction, they are switched to the terminals a2 sides. A controller 131 controls switches 114 and 118 so that memories 116-1 through- 3 respectively store the data from a decoder 111, e.g., the data in every predetermined units corresponding to individual one cycles of assigned time slots, for example. The respective data stored in the memories 116-1 through- 3 are successively read in predetermined time slots and recorded on recording unit through a time-sharing type bus 15. Upon reproduction, the respective data given in the predetermined units are successively written into the memories 116-1 through -3 in predetermined time slots through the bus 15 and output via an encoder 121 in one cycle of the time slots. Writing and reading processes are not executed simultaneously within the same memory and the recording and reproduction of data can be properly performed with ease. Data antecedent to and prior to the present time are stored in the memories, so that the response to a special reproducing operation can be made excellent.

7 Claims, 9 Drawing Sheets

DATA RECORDING AND REPRODUCING METHOD AND DATA RECORDING AND REPRODUCING APPARATUS

This application is a continuation of international application number PCTJP/98/03532, filed Aug. 7, 1998, now pending.

TECHNICAL FIELD

This invention relates to a data recording and reproducing method and a data recording and reproducing apparatus.

BACKGROUND ART

With a shift to a multichannel used for the provision of information due to the wide spread use of a CATV (Cable Television) or the like, there has recently been an increasing demand that a plurality of video/audio data are simultaneously recorded into and reproduced from one video/audio data recording and reproducing apparatus and reproduced therefrom while recording the data therein, as distinct from a conventional VTR (Video Tape Recorder). In order to meet such a demand, an apparatus called a video server (or also called AV (Audio and/or Video) server) for recording and reproducing images and voice using non-linear accessible recording mediums such as a hard disk, etc. is becoming pervasive.

In general, a video server used in a broadcast station needs mass capacity to record long-time data in addition to an increase in the transfer rate of required data from a demand for the quality of an image and sound quality. Therefore, an attempt to speed up the transfer rate of data and make mass storage by using a data recording and reproducing apparatus including a plurality of hard disk (hereinafter called HD) devices capable of storing video and audio data therein and performing parallel processing, and an attempt to make it possible to ensure reliability by recording parity data in case of a failure in any of the HD devices have been made. Thus, a multichannel video server can be implemented which can cope with various usage forms, for example, the construction of systems such as VOD (Video On Demand), NVOD (Near Video On Demand), etc. by recording dispersively material data comprised of a plurality of audio and video data and performing the simultaneous transmission of data through the multichannel in this state even when the number of channels required according to the contents of programs offered from a broadcast station and broadcast forms vary, or by reproducing the same material data through the multichannel with staggered reproduction times.

In a data recording and reproducing apparatus employed in such a video server, an RAID (Redundant Arrays of Inexpensive Disks) technique for constructing a hard disk drive (hereinafter called HDD) comprised of a plurality of HD in plural form, which has been proposed by a paper ("A Case for Redundant Arrays of Inexpensive Disks (RAID)", ACM SIGMOND Conference, Chicago, III, Jun. 1–3, 1988) published by Patterson et al. in 1988 has been used.

In the paper, RAID are classified into five levels ranging from RAID-1 to RAID-5. The RAID-1 level is a system for writing the same contents into two HDD. The RAID-3 level is a system for dividing input data into parts of a predetermined length and recording them on each of a plurality of HDD, and generating parity data corresponding to the exclusive OR of mutually-corresponding data blocks of the respective HDD and writing the parity data on another HDD. Further, the RAID-5 level is a system for increasing division units (blocks) of data, recording one divided data on one HDD as a data block, recording the results (parity data) of the exclusive OR of mutually-corresponding data blocks of respective HDD on other HDDs as parity blocks, and distributing the parity blocks to other HDDs. With respect to other levels of RAID, a reference is made to the above-described paper.

On the other hand, the video server is provided with an input/output processing processor for making it easy to store a material input from the outside in RAID referred to above, e.g., performing encoding/decoding such as compression, expansion or the like on it. When this one input/output processing processor treats with one input/output data (of one channel), the video server is provided with a plurality of input/output processing processors from the need of simultaneous execution of storage, transmission and editing and implements the input/output of a plurality of channels (multichannel).

Figure 11:
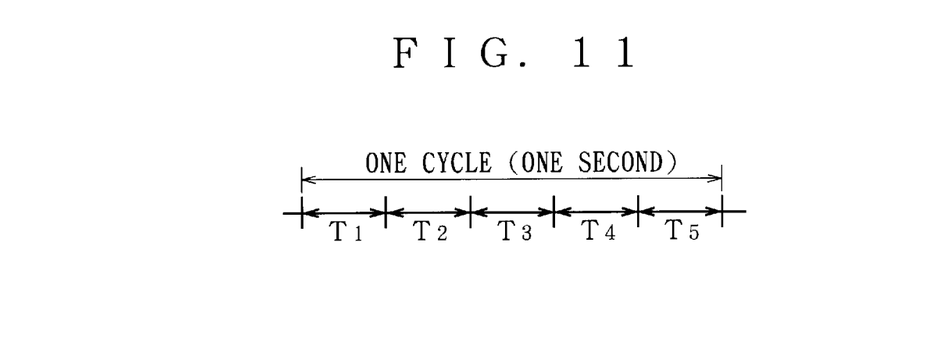
FIG. 11 is a diagram illustrating time slots.

Further, the simultaneous input/output of a plurality of channels is implemented by time-divisionally activating the input/output processors in assigned time slots. When, for example, one channel is used for data recording and four channels are used for data reproduction, one cycle, e.g., one second is first divided into five time slots [T1] through [T5] as shown in FIG. 11. During the time slot [T1], data corresponding to one channel is recorded and the recorded data is read out during the time slot [T2], whereby the data of one channel is reproduced and output. Further, the periods corresponding to the time slots [T3] through [T5] are also similar to the above, i.e., a process for reproducing and outputting data within the respective time slots [T3] through [T5] is performed. Thus, the recording of the data corresponding to one channel and the reproduction of the data of four channels can be simultaneously processed.

Meanwhile, such a data recording and reproducing apparatus has utilized two memories to record the data corresponding to one cycle in one time slot and output in one cycle the data read in one time slot. However, there may be cases in which if the timing provided to start operation upon data recording and reproduction is not adjusted, then the reading and writing of the data are simultaneously performed on one memory, whereby the operation thereof will fail.

When desired data is not read in a predetermined time slot where special reproduction such as fast-forward playback, fast-rewind playback or the like is performed by the video tape recorder, the special reproduction cannot be started, so that satisfactory response cannot be obtained.

Therefore, the present invention provides a data recording and reproducing method and a data recording and reproducing apparatus, which are capable of recording and reproducing data easily and properly and making response at a special reproducing operation satisfactory.

DISCLOSURE OF THE INVENTION

A data recording and reproducing method according to this invention, for recording input data on a non-linear accessible recording medium and reproducing the data recorded on the recording medium, using at least three data storing means, comprises a first step for writing the input data successively into the data storing means every predetermined units, supplying the written data to the recording medium through a transmission line on a time-shared basis, and recording the same on the recording medium, and a second step for writing the data read from the recording medium successively into the data storing means through the transmission line every predetermined units on a time-shared basis and outputting the data of predetermined units written into the data storing means.

Further, a data recording and reproducing apparatus according to this invention, for recording input data on a non-linear accessible recording medium and reproducing the data recorded on the non-linear accessible recording medium, comprises at least three data storing means supplied with the input data and for temporarily storing the input data therein, data recording and reproducing means for receiving the data output from the data storing means, recording the data on the non-linear accessible recording medium, reproducing the data recorded on the non-linear accessible recording medium and supplying the same to the storing means, time slot generating means for generating time slots, and control means for performing control for writing the input data successively into the data storing means every predetermined units, supplying the written data to the data recording and reproducing means within assigned time slots generated from the time slot generating means, and writing the data reproduced by the data recording and reproducing means successively into the data storing means within the assigned time slots generated from the time slot generating means.

In the present invention, recorded data are successively written into at least three data storing means every predetermined units upon recording the data therein. The data written into each data storing means is supplied to data recording means in an assigned predetermined time slot through a transmission line and recorded on a non-linear accessible recording medium. Here, the data corresponding to one cycle of assigned time slots, for example, is successively written into the respective data storing means.

On the other hand, when data is reproduced, the data corresponding to one cycle of time slots, for example, is read from the non-linear accessible recording medium and stored in the corresponding buffer. Further, the stored data is written into each of the data storing means in each assigned predetermined time slot through the transmission line. The data written into each data storing means is read with a time interval corresponding to one cycle of time slots and output as reproduction data.

BEST MODE FOR CARRYING OUT THE INVENTION

Figure 1:
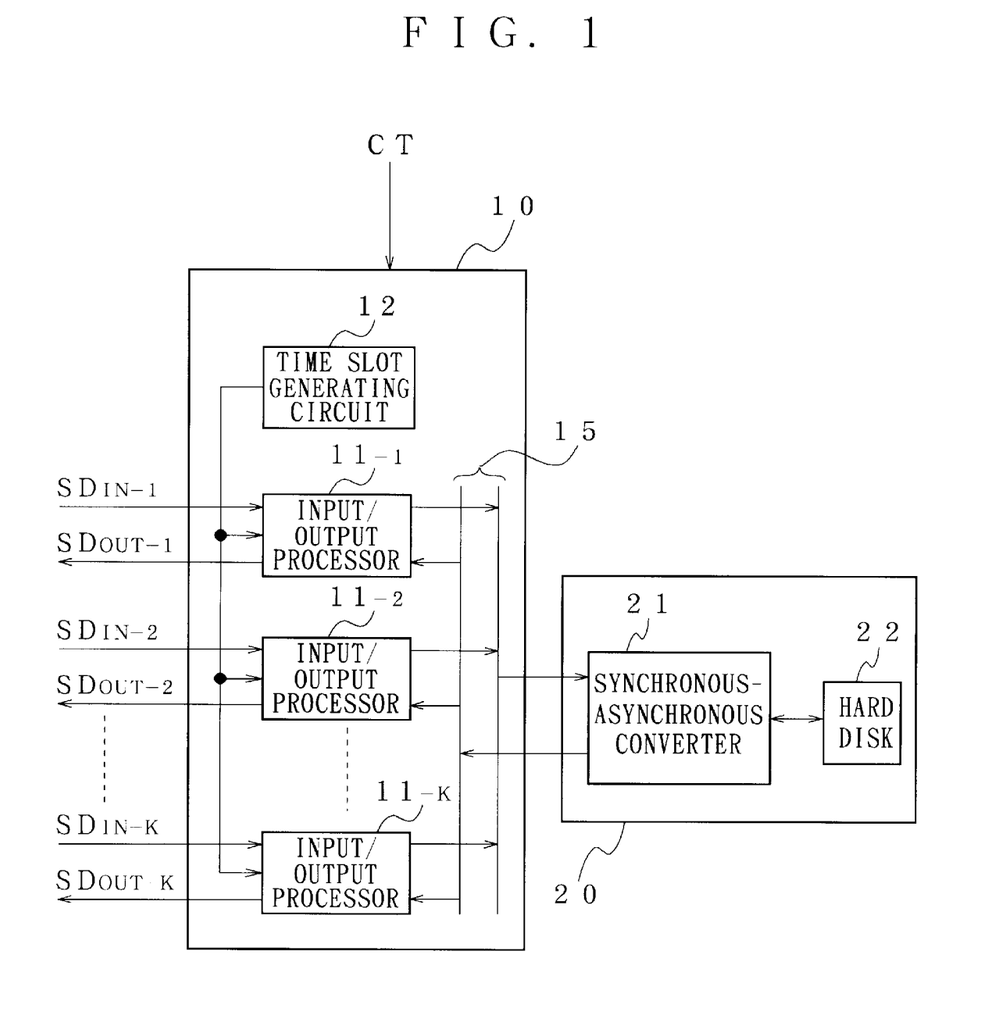
FIG. 1 is a diagram showing an overall configuration of a data recording and reproducing apparatus according to the present invention.

FIG. 1 shows an overall configuration of a data recording and reproducing apparatus. The data recording and reproducing apparatus principally comprises a processor circuit 10 and a disk array device 20.

The processor circuit 10 is made up of a plurality of input/output processors 11-1, 11-2, . . . , 11-k and a bus 15.

The plurality of input/output processors 11-1, 11-2, . . . , 11-k receive data from the outside every one channels (every one systems) and transmit the data to the outside everyone channels, respectively. For example, the input/output processor 11-1 receives the data SDin-1 including video and/or audio data from the outside and then transmits the data SDout-1 including video and/or audio data to the outside. In the present embodiment, the input data SDin-1, SDin-2, . . . , SDin-k and output data SDout-1, SDout-2, . . . , SDout-k are respectively serial data represented in serial digital interface (SDI) format standardized by SMPTE259M.

The input/output processor 11-1 separates video and audio data from the input serial data SDin-1 and performs predetermined processing on it and thereafter outputs it to the bus 15. A detailed description of the input/output processor 11-1 will be described later. The processing of the input/output processor 11-1 is performed within each assigned time slot of time slots generated by a time slot generating circuit 12 as described in the Background Art and outputs the processed data to the disk array device 20 through the bus 15.

The disk array device 20 comprises a synchronous-asynchronous converter 21 and a hard disk 22.

The synchronous-asynchronous converter 21 is used to accommodate delays or the like of processing between the synchronous processor circuit 10 and the hard disk 22 which records data therein and reproduces the data therefrom asynchronously. The synchronous-asynchronous converter 21 is comprised of an unillustrated memory, for example. Data input via the bus 15 is synchronously written into the memory and the written data is read asynchronously.

The hard disk 22 used as a non-linear accessible recording medium is used to store the data input from the synchronous-asynchronous converter 21. The writing of the data into the hard disk 22 is performed based on command data issued from the input/output processors 11-1 through 11-k.

Now, the hard disk 22 shown in FIG. 1 is a hard disk drive comprised of a plurality of hard disks. Further, the disk array device 20 takes a RAID (Redundant Arrays of Inexpensive Disk) configuration in which the hard disk drive is arranged in plural form. However, it is described as the hard disk 22 and disk array device 20 in FIG. 1 for convenience of illustration. The present embodiment will be explained below based on them.

When data recorded on the hard disk 22 is reproduced, the data is output from the hard disk 22 based on command data produced from the input/output processors 11-1 through 11-k, for providing instructions for data reproduction and thereafter output to the synchronous-asynchronous converter 21. The synchronous-asynchronous converter 21 outputs reproduced data to the bus 15 in synchronism with the processing of the processor circuit 10 and said reproduced data is input to the input/output processors 11-1 through 11-k respectively.

Even here, the reproduced data is input from the synchronous-asynchronous converter 21 to the input/output processor 11-1 through the bus 15 within the time slot assigned to the input/output processor 11-1, of the time slots generated from the time slot generating circuit 12. Thereafter, the input/output processor 11-1 subjects the reproduced data to a predetermined process and outputs the so-processed reproduced data SDout-1 to the outside as the SDI format.

Similarly, the respective input/output processors 11-2 through 11-k record and/or reproduce data in and from the disk array device 20 within their corresponding assigned time slots.

A detailed description of the input/output processor 11-1 will be explained with reference to FIG. 2. Incidentally, other input/output processors 11-2 through 11-k are also similar in configuration to the above and the input/output processor 11-1 will therefore be described for convenience of illustration.

The input/output processor 11-1 principally comprises a decoder 111, an input/output selector switch 112, a memory selector switch 114, memories 116-1, 116-2 and 116-3 provided in a three-bank configuration, a memory selector switch 118, an input/output selector switch 119, an output interface 120, an input interface 113, an encoder 121, an input/output controller 131 and a command generator 132.

The decoder 111 separates video and/or audio data from serial data given in the SDI format and input to the input/output processor 11-1, and outputs it therefrom. Further, MPEG (Moving Pictures Experts Group) and DV type compressing processes are effected on the data within the decoder 111 as needed.

The input/output selector switch 112 selectively switches between terminals a1 and a2 to output the data input to either the terminal a1 or the terminal a2 through a movable terminal b. This switching is performed under the control of the input/output controller 131 to be described later.

The memory selector switch 114 is comprised of a movable terminal b and a plurality of terminals a1, a2 and a3. The memory selector switch 114 performs selective switching of the data input to the movable terminal b and outputs it from any of the terminals a1, a2 and a3. Here, the movable terminal b of the memory selector switch 114 and the movable terminal b of the input/output selector switch 112 are electrically connected to each other. The switching of the memory selector switch 114 is performed under the control of the input/output controller 131.

The respective terminals a1, a2 and a3 of the memory selector switch 114 are respectively electrically connected to the memories 116-1, 116-2 and 116-3 through buffer gates 115-1, 115-2 and 115-3.

One bank-configured memories 116-1, 116-2 and 116-3 are memories for accommodating times spent between serial data SDIin-1 input in real time and data supplied to the disk array device 20 through the bus 15 in assigned time slots. They will be described in detail later.

Respective memories 116-1, 116-2 and 116-3 are electrically connected to terminals a1, a2 and a3 of the memory selector switch 118 through buffers 117-1, 117-2 and 117-3.

The memory selector switch 118 is constructed so as to perform switching selectively between outputs from the terminals a1, a2 and a3 and output the selected one to a movable terminal b thereof. This switching is controlled based on a control signal SWC output from the input/output controller 131 so that a selection as to which one of terminals a1, a2 and a3 should be connected to the movable terminal b, is made.

The movable terminal b of the memory selector switch 118 is electrically connected to a movable terminal b of the input/output selector switch 119. The input/output selector switch 119 is constructed so as to perform selective switching on an output delivered from the movable terminal b and thereby output the selected output to either one of terminals a1 and a2 thereof. This switching is controlled based on the control signal SWC of the input/output controller 131 so that a selection as to whether the output from the movable terminal b should be connected to any of the terminals a1, a2 and a3 and the movable terminal b, is made.

The terminal a1 of the input/output selector switch 119 is electrically connected to the output interface 120, whereas the terminal a2 of the input/output selector switch 119 is electrically connected to the encoder 121.

The output interface 120 is used to convert data output from the input/output selector switch 119 to a transmission format for the bus 15.

The output interface 120 is supplied with a command data CD output from a command generator 132, and it adds the command data CD to the data input to the output interface 120 and transfers the resultant data to the bus 15. The data output from the output interface 120 is supplied to the disk array device 20 through the bus 15. Thus, the data transferred to the bus 15 has a data structure in which the command data CD is added to the data recorded on the hard disk 22 of the disk array device 20.

Further, the data to be input to the input interface 113 has a data structure in which status data is added to the data reproduced from the disk array device. The input interface 113 separates the status data from the reproduced data and outputs the reproduced data to the terminal a2 of the input/output selector switch 112. The separated status data is output to the input/output controller 131.

The encoder 121 electrically connected to the terminal a2 of the input/output selector switch 119 is used to principally encode the data output from the disk array device 20 into serial data represented in SDI format. When the data transferred from the disk array device 20 is compressed data, an unillustrated compression/expansion processor of the encoder 121 performs an expanding process on it and transforms the expanded data into the SDI format, which in turn is output therefrom.

Based on a control signal CT for controlling recording and reproduction of data supplied from the outside, the input/output controller 131 generates a switch control signal SWC for controlling the input/output selector switches 112 and 119 and the memory selector switches 114 and 118, and a memory control signal MC for controlling the writing of data into and reading of data from the memories 116-1 through 116-3. Further, the input/output controller 131 generates a control signal ARC for allowing the command generator 132 to generate predetermined command data and supplies it to the command generator 132.

The command generator 132 generates command data CD for controlling the disk array device 20 based on the control signal ARC and supplies it to the output interface 120.

A description will next be made of a data recording operation of an input/output processor constructed as described above, using the drawings. FIG. 3A shows recorded data. When a control signal CT indicative of a [Rec] command for starting the recording of data is supplied to the input/output controller 131, the movable terminals b of the input/output selector switches 112 and 119 are respectively set to the terminals a1 based on a switch control signal SWC as shown in FIG. 2. Incidentally, FIG. 3B shows a time slot pulse indicative of the initiation of each time slot. With the time slot pulse as the reference, time slots [T1] through [T5] for performing recording and reproduction of data of 5 channels, for example are set as shown in FIG. 3C. The time slots are generated by the time slot generating circuit 12 and input to the input/output processors.

Figure 3A:
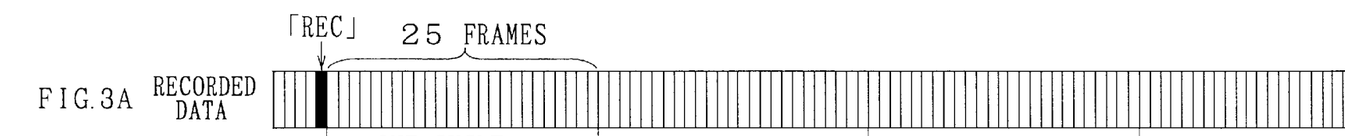
FIGS. 3A through 3G are respectively diagrams for describing a data recording operation.
Figure 3B:
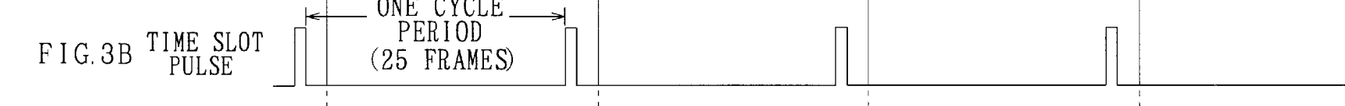
Figure 3C:
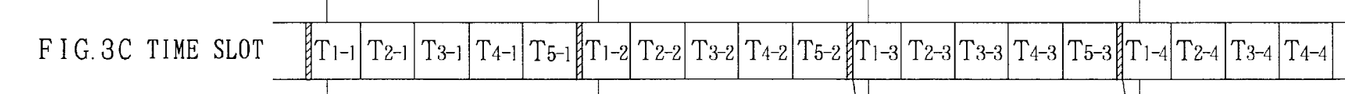
Figure 3D:
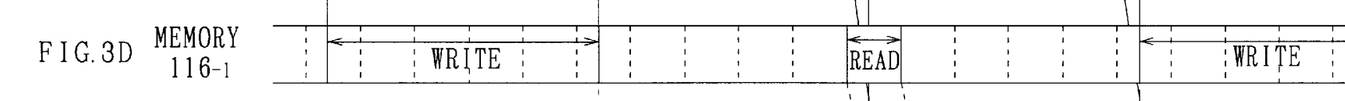
Figure 3E:
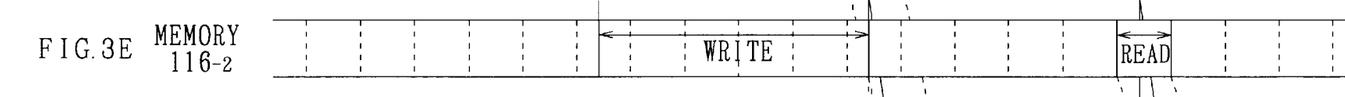
Figure 3F:
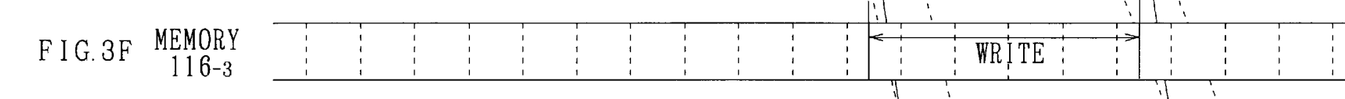

When the movable terminal b of the memory selector switch 114 is now switched to the terminal a1 side, data corresponding to one cycle from the supply of [Rec] command, e.g., 25 frames is written into the memory 116-1 as shown in FIG. 3D. Next, when the data corresponding to one cycle is written into the memory 116-1, the movable terminal b of the memory selector switch 114 is switched to the terminal a2 side by the switch control signal SWC so that data corresponding to the next one cycle is written into the memory 116-2 as shown in FIG. 3E. Further, when the data corresponding to one cycle is written into the memory 116-2, the movable terminal b of the memory selector switch 114 is switched to the terminal a3 side by the switch control signal SWC so that the data corresponding to the next one cycle is written into the memory 116-3 as shown in FIG. 3F. Thereafter, the data corresponding to one cycle is written into the memory 116-1 again, and thus each of the data corresponding to one cycle are respectively and successively written into the memories 116-1 through 116-3 in a manner similar to the above.

Figure 3G:
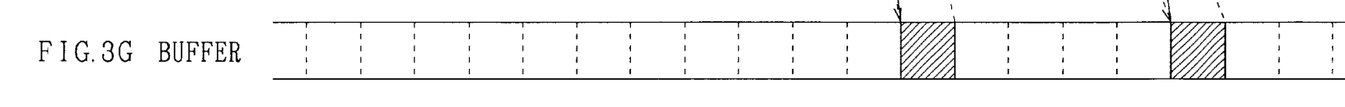

Now, when the transmission of the data written into the memories 116-1 through 116-3 is assigned to the time slot [T1], for example, the writing of data corresponding to one cycle into the memory 116-1 is completed during a time slot [T1-2]. Therefore, the data written into the memory 116-1 is read during the next predetermined time slot [T1-3] and supplied to the disk array device 20 through the output interface 120 and the bus 15, after which it is stored in the corresponding buffer of the synchronous-asynchronous converter 21. The data stored in the buffer is asynchronously recorded on the hard disk 22 during a diagonally-shaded period in FIG. 3G. During a time slot [T1-4], the data written into the memory 116-2 is read and stored in the buffer of the synchronous-asynchronous converter 21, after which it is recorded on the hard disk 22. In a manner similar to the above subsequently, the respective data written into the memories 116-1 through 116-3 are read within their corresponding assigned time slots and thereafter recorded on the hard disk 22. Incidentally, the diagonally-shaded portion of the time slot [T1] in FIG. 3C indicates the command data CD and is similar even in the following drawings.

Further, the writing of data in and reading of data from the memories 116-1 through 116-3 are not performed simultaneously during the same time slot. Since the supplied data is written into the memory 116-2 or memory 116-3 when the data stored in the memory 116-1 is read during the time slot [T1-3], for example, the operation of recording of data does not fail.

Figure 2:
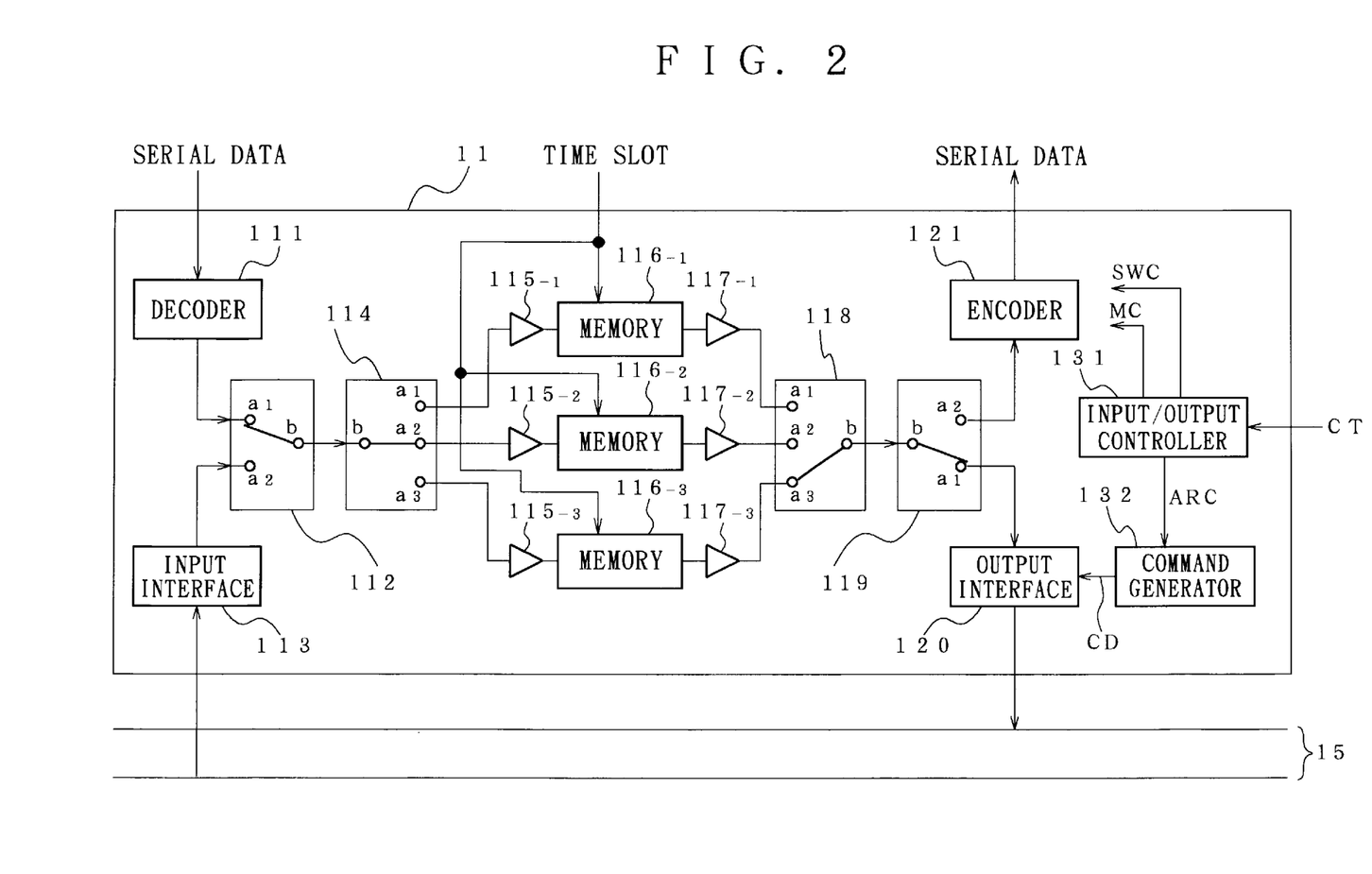
FIG. 2 is a diagram illustrating a configuration of an input/output processor.
Figure 4A:
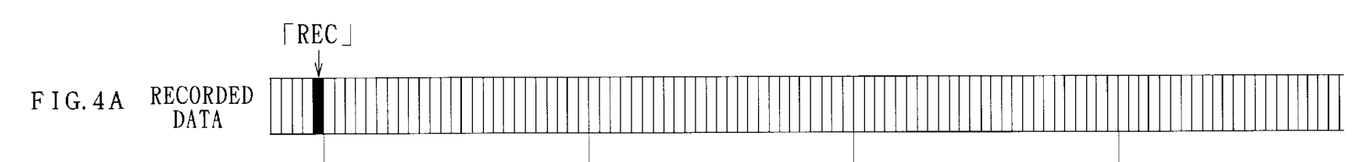
FIGS. 4A through 4F are respectively diagrams for describing a data recording operation at the time that a memory 116-3 is not provided.
Figure 4B:
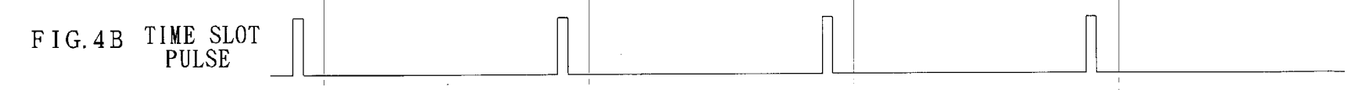
Figure 4C:
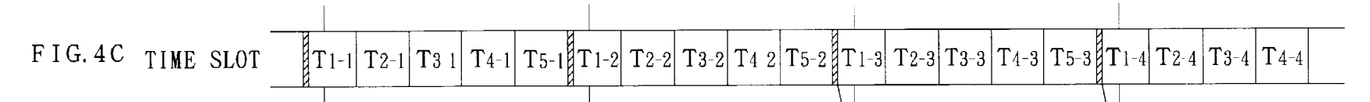
Figures 4D, 4E, 4F:
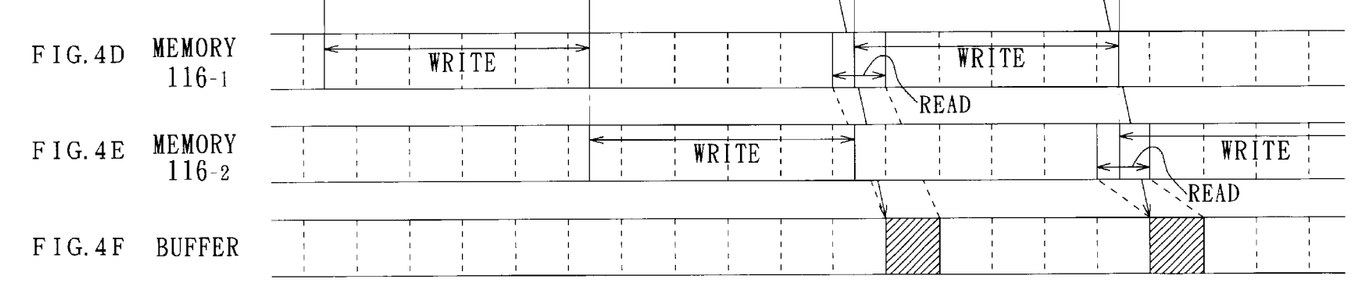
Figure 5A:
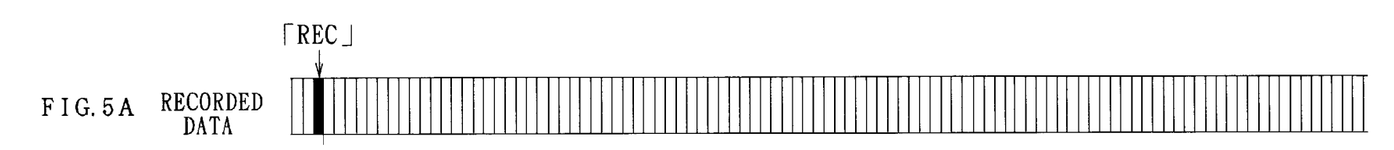
FIGS. 5A through 5F are respectively diagrams for describing a data recording operation at the time that the memory 116-3 is not provided.
Figure 5B:
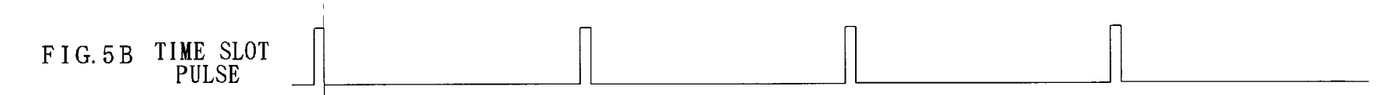
Figure 5C:
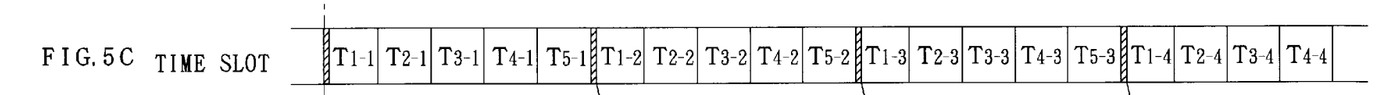

Therefore, in the conventional data recording and reproducing apparatus, e.g., one of a type wherein the data corresponding to one cycle is recorded on the disk array device 20 in one time slot with the two memories except for the memory 116-3 of the input/output processor 11 shown in FIG. 2, the writing of data into the memory 116-1 is completed during a time slot [T1-2] as shown in FIG. 4D. During the next time slot [T1-3], the reading of the data from the memory 116-1 is performed and the writing of data into the memory 116-2 shown in FIG. 4E is finished, whereby the writing of data into the memory 116-1 is also performed simultaneously. Therefore, a process for adjusting timing for a [Rec] command shown in FIG. 5A and timing for a time slot shown in FIG. 5C to thereby prevent simultaneous execution of data writing and reading becomes unnecessary owing to the provision of the memory 116-3.

Figure 5D:
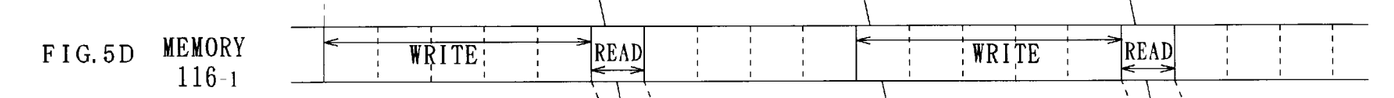
Figure 5E:
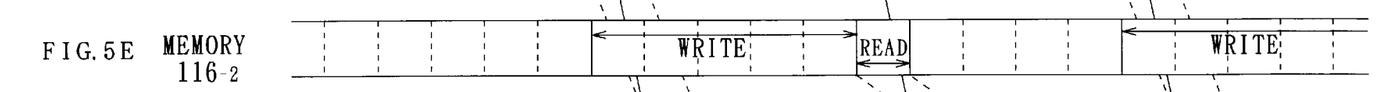
Figure 5F:
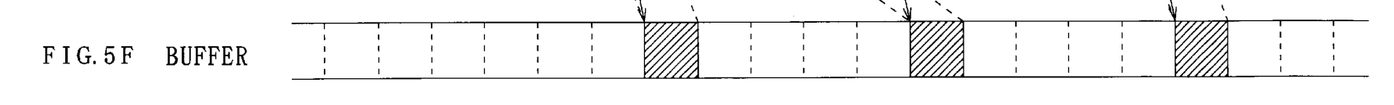

Namely, it is unnecessary to execute a process for starting the writing of data into the memory 116-1 with timing provided to start a predetermined time slot [T1-1] and completing the writing of the data therein in a time slot [T5-1] as shown in FIG. 5D and reading the data written therein during a time slot [T1-2], and similarly processing the memory 116-2 too as shown in FIG. 5E, thereby preventing the simultaneous writing and reading of data into and from the same memory. Therefore, a data recording operation can be simplified. Owing to the provision of the memory 116-3 as in the present application, such a process becomes unnecessary. Incidentally, FIG. 4A indicates the recorded data, FIG. 4B and FIG. 5B indicate the time slot pulses respectively, FIG. 4C indicates the time slot, and FIG. 4F and FIG. 5F indicate the buffers of the synchronous-asynchronous converter 21, respectively.

A data reproducing operation will next be described. FIGS. 6A through 6G are diagrams respectively showing the operation of reproduction of the data recorded on the disk array device 20. When a [Cue up] command for making preparations for outputting data simultaneously with the initiation of reproduction of the data is supplied, desired data is asynchronously read into the corresponding buffer of the synchronous-asynchronous converter 21 based on the [Cue up] command during a diagonally-shaded period in FIG. 6G. Further, the movable terminals b of the input/output selector switches 112 and 119 shown in FIG. 1 are respectively switched to the terminals a2 sides by the switch control signal SWC.

Figure 6A:
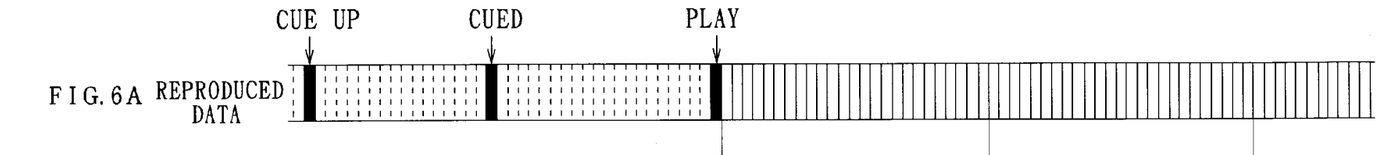
FIGS. 6A through 6G are respectively diagrams for describing a data reproducing operation.
Figure 6B:
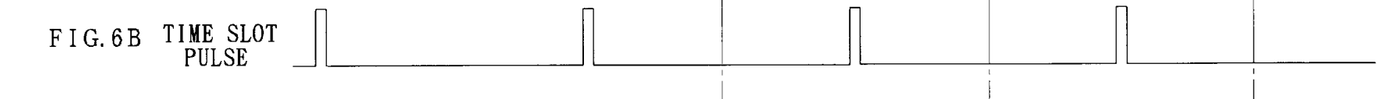
Figure 6C:
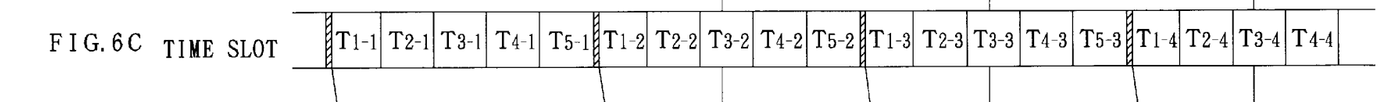

Incidentally, FIG. 6A indicates reproduced data and FIG. 6B indicates a time slot pulse indicative of the initiation of each time slot, respectively. With the time slot pulse as the reference, time slots [T1] through [T5] are set as shown in FIG. 6C.

Figure 6D:
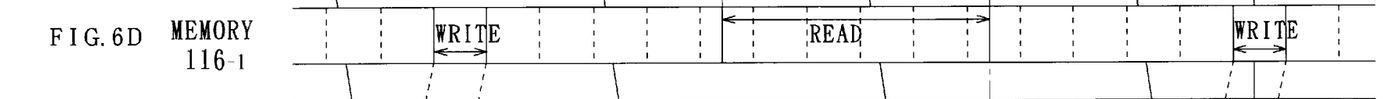
Figure 6E:
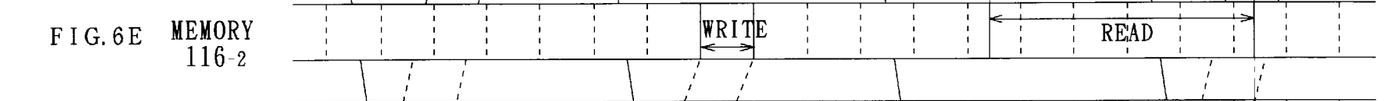

When the movable terminal b of the memory selector switch 114 is now switched to the terminal a1 side, the data stored in a buffer of the synchronous-asynchronous converter 21 is written into the memory 116-1 during its assigned predetermined time slot, e.g., [T3-1] as shown in FIG. 6D. Further, when the writing of the data into the memory 116-1 is completed, a [Cued] command indicative of the completion of preparations is output. Thereafter, the movable terminal b of the memory selector switch 114 is switched to the terminal a2 side by the switch control signal SWC during the following predetermined time slot [T3-2] so that the next data stored in the corresponding buffer of the synchronous-asynchronous converter 21 is written into the memory 116-2 as shown in FIG. 6E.

When a [Play] command for starting reproduction is supplied during a time slot [T3-2], for example, the movable terminal b of the memory selector switch 118 is switched to the terminal a1 side by the switch control signal SWC so that the data stored in the memory 116-1 is read in one cycle. Thereafter, the read data is converted into the SDI format by the encoder 121, which in turn is output as reproduced data as shown in FIG. 6A.

Figure 6F:
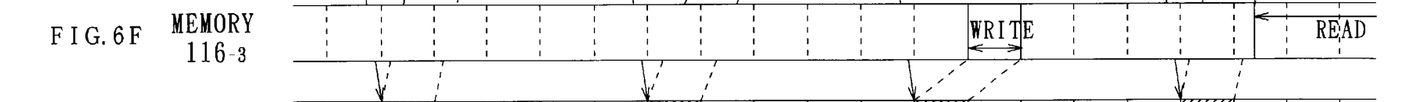
Figure 6G:
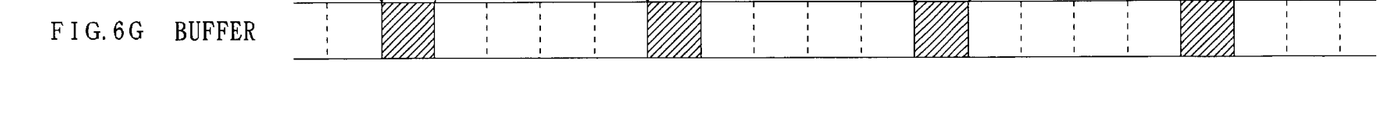

Thereafter, when one cycle has elapsed since the [Play] command, the movable terminal b of the memory selector switch 118 is switched to the terminal a2 side by the switch control signal SWC so that the data stored in the memory 116-2 is read in one cycle and output as data represented in SDI format. During a time slot [T3-3], the movable terminal b of the memory selector switch 114 is switched to the terminal a3 side by the switch control signal SWC so that the next data stored in the buffer of the synchronous-asynchronous converter 21 is written into the memory 116-3, as shown in FIG. 6F.

Similarly to the above subsequently, the data read from the disk array device 20 is written into each of the memories 116-1 through 116-3 within each assigned time slot. Further, the respective data written into the memories 116-1 through 116-3 are read in one cycle and output as data represented in SDI format.

The writing and reading of the data into and from the memories 116-1 through 116-3 are not performed simultaneously within the same time slot. Since the data read from the disk array device 20 is written into the memory 116-2 while the data stored in the memory 116-1 is read during the time slot [T3-2], for example, the operation of reproduction of data does not fail.

Figure 7A:
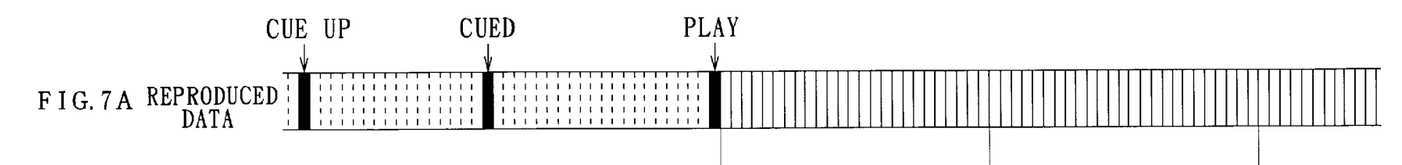
FIGS. 7A through 7F are respectively diagrams for describing a data reproducing operation at the time that the memory 116-3 is not provided.
Figure 7B:
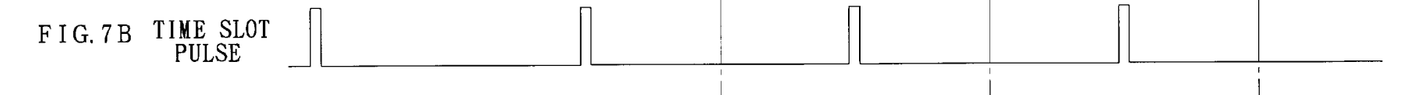
Figure 7C:
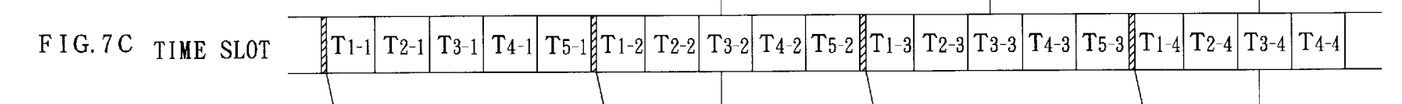
Figure 7D:
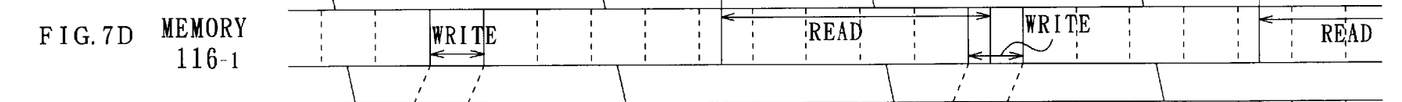
Figures 7E, 7F:
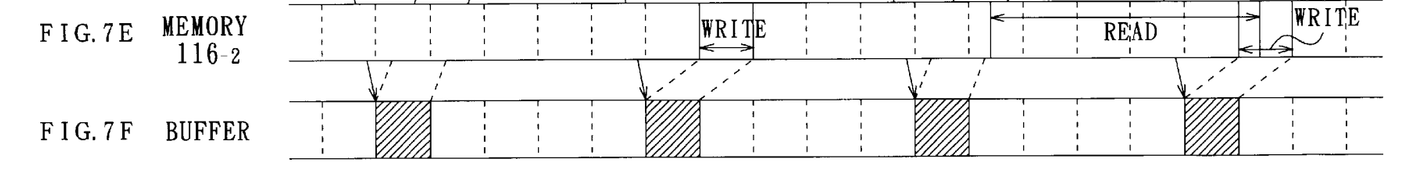
Figure 8A:
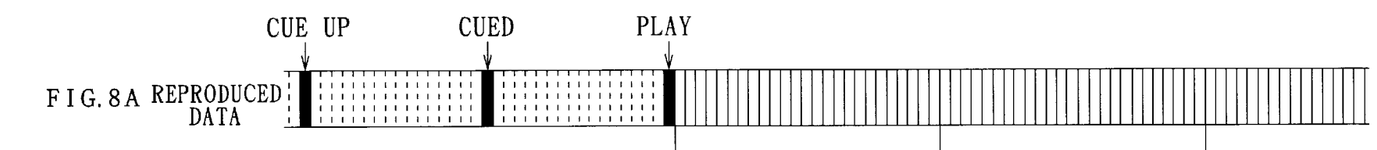
FIGS. 8A through 8F are respectively diagrams for describing a data reproducing operation at the time that the memory 116-3 is not provided.
Figure 8B:
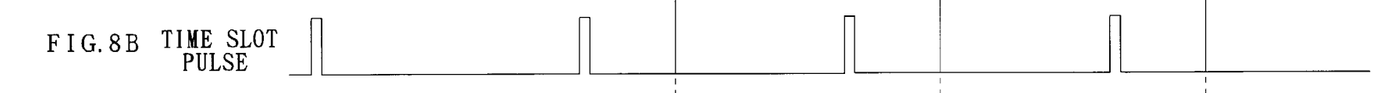
Figure 8C:
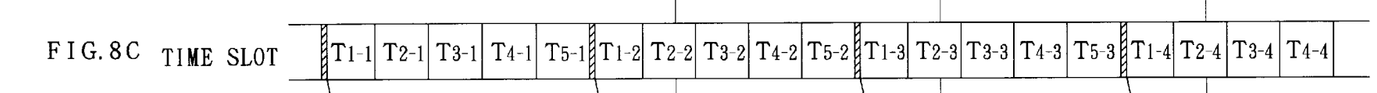
Figure 8D:
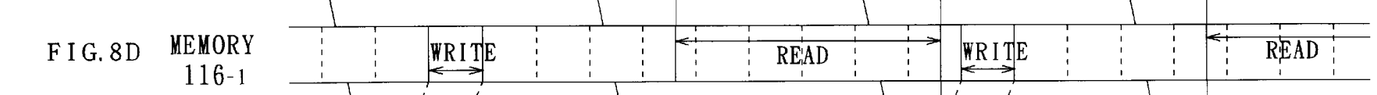
Figure 8E:
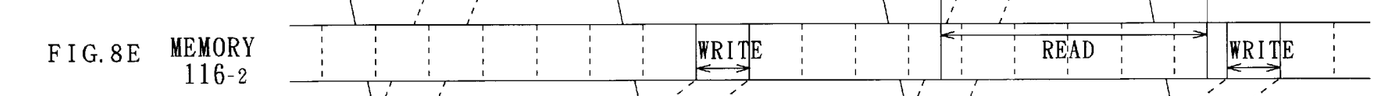
Figure 8F:
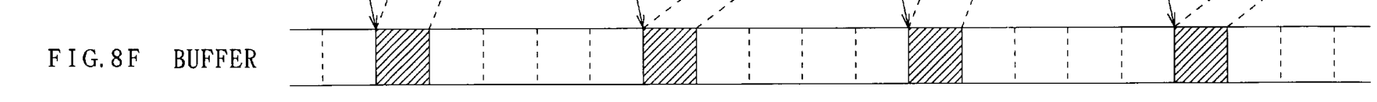

Therefore, in the conventional data recording and reproducing apparatus of a type wherein data read during one time slot from the disk array device is output in one cycle through the use of the two memories except for the memory 116-3 shown in FIG. 1, for example, when the data written into the memory 116-1 is read and output as shown in FIG. 7D during a time slot [T3-2] shown in FIG. 7C, the reading of the data written into the memory 116-1 is completed during the next predetermined time slot [T3-3] and the writing of data into the memory 116-1 is started before the reading of the data written into the memory 116-2 is started. Therefore, the data are simultaneously written into and read from the memory 116-1 and thus the operation of reproduction of data fails. For this reason, the timing for a [Play] command and that for each time slot shown in FIG. 8C are adjusted as shown in FIGS. 8A through 8F to control data reading so as to avoid the initiation of reading of data during a predetermined time slot [T3-2] as shown in FIG. 8D. However, in the present application, a process for preventing simultaneous execution of the writing and reading of data into and from the memory 116-1 and the writing and reading of data into the memory 116-1 as shown in FIG. 8E becomes unnecessary owing to the provision of the memory 116-3. Incidentally, FIGS. 7A and 8A indicate reproduced data, FIGS. 7B and 8B indicate time slot pulses, and FIGS. 7F and 8F indicate buffers of the synchronous-asynchronous converter 21, respectively.

Figure 9A:
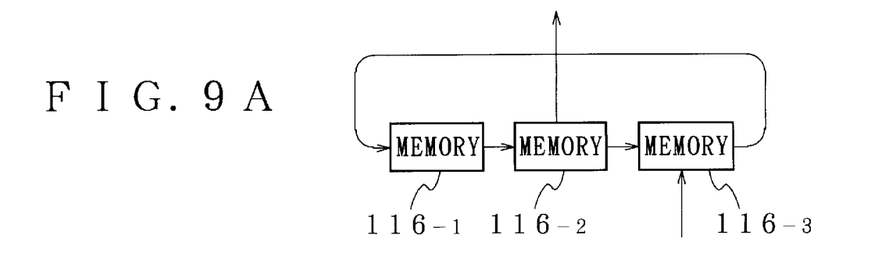
FIGS. 9A through 9B are respectively diagrams for describing a special reproducing operation.
Figure 9B:
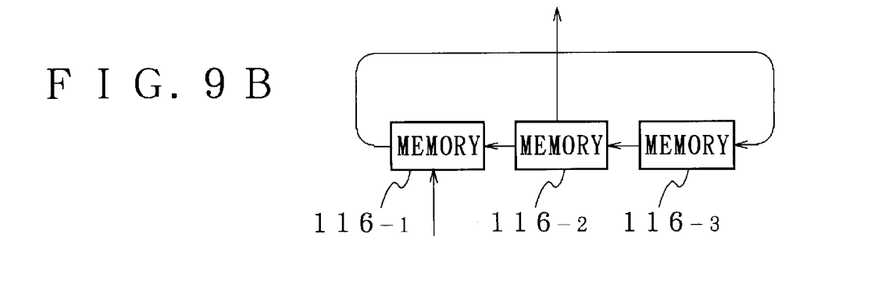

Further, since there are provided three or more memories, a special reproducing operation can be promptly started if respective data lying before and after the cycle in which data is kept in an output state, are held in the memories. For example, in a case that, when data is reproduced in the forward direction as shown in FIG. 9A, the data is regarded as being read in order of the memories 116-1, 116-2, 116-3, 116-1, . . . , or that, when data is reproduced in the reverse direction as shown in FIG. 9B, the data is regarded as being read in order of the memories 116-3, 116-2, 116-1, 116-3, . . . , a special reproducing operation in the forward direction can be started promptly while the data is read from the memory 116-2 as shown in FIG. 9A by storing the data ahead of the data read from the memory 116-2 in the memory 116-3. Further, when data prior to the data read from the memory 116-2 is regarded as being stored in the memory 116-1 while the data is read from the memory 116-2 as shown in FIG. 9B, then a special reproducing operation in the reverse direction can be started promptly.

Figure 10:
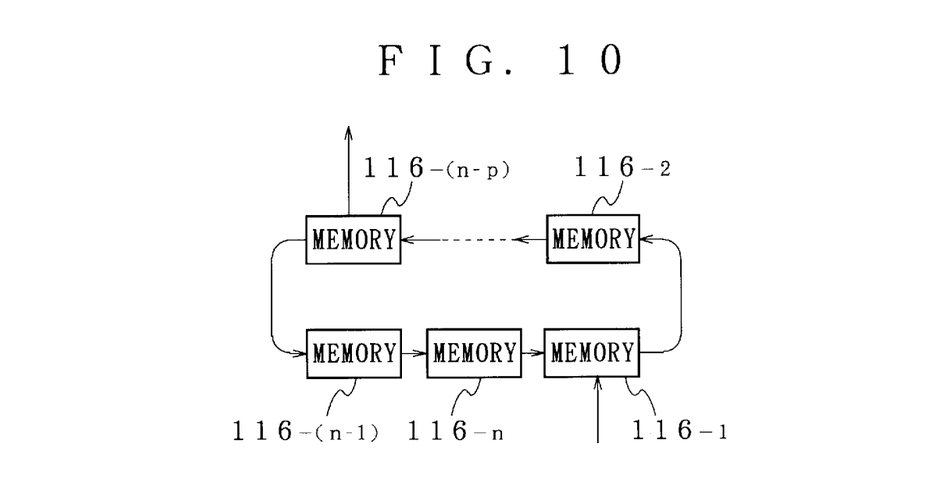
FIG. 10 is a diagram showing another embodiment.

Further, if the number of memories is increased to n as shown in FIG. 10 and data ahead of or antecedent to and data prior to data read from memories 116-(n−p) are regarded as being stored in other memories, then they can hold the data ahead of and/or prior to the read data in large quantity. Therefore, a satisfactory special reproducing operation can be performed quickly.

In the aforementioned embodiment, the video and audio data are used as those to be recorded or reproduced. However, the data is not necessarily limited to the video and audio data. If the data recording and reproducing apparatus of the present application is provided between a mechanism for synchronously transmitting data through a time-sharing type bus and a mechanism for processing data in asynchronism with the mechanism, then processes such as the transfer of data, etc. can be easily performed. Further, although the hard disk 22 is used in the disk array device, it is needless to say that an optical disc or the like may be used as a recording medium.

INDUSTRIAL APPLICABILITY

As described above, the data recording and reproducing method and data recording and reproducing apparatus according to the present invention are useful for the storage of materials used in a program and the transmission of the program, etc. They are suitable for use in the execution of a special reproducing operation or the like in particular.

What is claimed is:

1. A data recording and reproducing method for recording input data on a non-linear accessible recording medium and reproducing the data recorded on said recording medium, using at least three data storing means, comprising the following steps:

a first step for writing predetermined substantially sequential units of the input data into each of said at least three data storing means successively, supplying said written data to said recording medium through a transmission line on a time-shared basis, and recording the written data on said recording medium; and a second step for reading predetermined substantially sequential units of data from said recording medium and successively writing the predetermined substantially sequential units of data into each of said at least three data storing means through the transmission line on a time-shared basis and outputting the data written into said at least three data storing means in sequence.

2. The data recording and reproducing method according to claim 1, wherein input/output processing means having said first step and said second step are provided in plural-stage form, and in said first step and said second step included in said plurality of input/output processing means, the recording of the data on said recording medium and the output of the data written into said recording medium are performed using said transmission line on a time-shared basis with timings different from each other.

3. The data recording and reproducing method according to claim 2, further including time slot generating means, and wherein said first step is executed such that said plurality of input/output processing means respectively record the data on said recording medium on a time-shared basis within assigned time slots generated from said time slot generating means, and said second step is executed such that said plurality of input/output processing means respectively output the data written into said recording medium on a time-shared basis within assigned time slots generated from said time slot generating means.

4. A data recording and reproducing apparatus for recording input data on a non-linear accessible recording medium and reproducing the data recorded on said non-linear accessible recording medium, comprising:

at least three data storing means supplied with input data and for temporarily storing the input data therein;

data recording and reproducing means for receiving the data output from said data storing means, recording the data on said non-linear accessible recording medium, reproducing the data recorded on said non-linear accessible recording medium and supplying the data to said storing means;

time slot generating means for generating time slots; and control means for performing control for writing predetermined substantially sequential units of the input data into each of said at least three data storing means successively, supplying the written data to said data recording and reproducing means within assigned time slots generated from said time slot generating means, and writing the substantially sequential data reproduced by said data recording and reproducing means into each of said at least three data storing means within the assigned time slots generated from said time slot generating means and outputting the data written into said at least three data storing means successively.

5. The data recording and reproducing apparatus according to claim 4, further including a plurality of input/output processors provided with said three data storing means, said data recording and reproducing means and said control means;

wherein within the assigned time slots generated from said time slot generating means, said time slots being different from each other at said plurality of input/output processors, said control means supplies the data written into said data storing means to said data recording and reproducing means and writes the data reproduced by said data recording and reproducing means into said data storing means.

6. The data recording and reproducing apparatus according to claim 4, further including first selecting means for distributing the input data to said at least three data storing means respectively and second selecting means for selecting one from the data read respectively from said at least three data storing means;

wherein said control means controls said first selecting means so that the data is stored in each of said data storing means every said predetermined units and controls said second selecting means so that the data written into said data storing means is read successively every predetermined units.

7. The data recording and reproducing apparatus according to claim 4, wherein said recording medium comprises a plurality of non-linear accessible recording mediums;

wherein said data recording and reproducing means has buffers for temporarily storing the data read and supplied from said data storing means and the data respectively supplied from said plurality of non-linear accessible recording mediums; and wherein said data recording and reproducing means separates the data temporarily stored in said buffers and supplied from said data storing means so as to be respectively recorded on said plurality of non-linear accessible recording mediums, multiplexes the data from said plurality of non-linear accessible recording mediums, temporarily stored in said buffers, and supplies the multiplexed data to said data storing means.

* * * * *